United States Patent [19]

Brode et al.

[11] 4,433,129
[45] Feb. 21, 1984

[54] HEMI-FORMALS OF METHYLOLATED PHENOLS

[75] Inventors: George L. Brode; Sui-Wu Chow, both of Bridgewater Township, Somerville County, N.J.

[73] Assignee: Union Carbide Corporation, Danbury, Conn.

[21] Appl. No.: 340,790

[22] Filed: Jan. 19, 1982

[51] Int. Cl.³ .............................................. C08G 8/10
[52] U.S. Cl. ................................... 528/154; 528/155; 568/592; 568/593
[58] Field of Search ................ 528/154, 155; 568/592, 568/593

[56] References Cited

U.S. PATENT DOCUMENTS 2,609,352 9/1952 Kvalnes ................................. 528/155
2,894,931 7/1959 Sommerville ......................... 528/154

FOREIGN PATENT DOCUMENTS 667360 11/1965 Belgium .

OTHER PUBLICATIONS

Walker, Formaldehyde, 3rd Edition, Reinhold Publishing Corp., New York (1964), pp. 305-306.
Bakeland and Bender "Industrial and Engineering Chemistry," vol. 17, No. 3, pp. 225-237 (1925).
Strupinskaya et al., Plast. Massy 1968 (12) pp. 18-20.

Primary Examiner—Paul R. Michl
Attorney, Agent, or Firm—James L. Sonntag

[57] ABSTRACT

This invention is directed to hemi-formals having the following formulas:

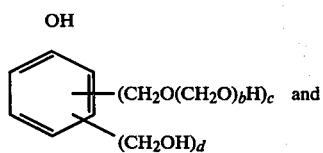

and

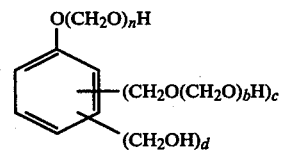

wherein b is 1 to about 5, c is 1 to about 3, d is 0 to about 2, the sum of c and d does not exceed 3 and is equal to or greater than 1 and n has a value equal to or greater than 1. These materials can be used to manufacture phenolic resins and are adaptable to liquid injection molding processes.

9 Claims, No Drawings

HEMI-FORMALS OF METHYLOLATED PHENOLS

This application contains subject matter disclosed in U.S. application Ser. No. 242,995, filed Mar. 12, 1981, now abaondoned in favor of continuation-in-part U.S. patent application, Ser. No. 340,695, filed Jan. 19, 1982.

This invention is directed to hemiformals of methylolated phenols. The hemiformals are formed by the reaction of formaldehyde with the phenolic hydroxyl groups and methylol groups of methylolated phenols. They are preferably formed from a reaction mixture of formaldehyde and phenol in the presence of a divalent metal catalyst, wherein methylolated phenols are formed in situ in the reaction mixture. This invention is directed in particular to methylolated hemiformals of phenol which are stable and can be stored for considerable periods of time. Contemplated are liquid hemiformal compositions which are curable to a phenolic resin when utilized with conventional phenol aldehyde resin curing catalysts.

The production of hemiformals of phenol have been speculated about in the literature for a considerable period of time. Illustrative of such literature is Walker, FORMALDEHYDE, 3rd Edition, published by Reinhold, Publishing Corporation, New York, (1964), pages 305, 306 wherein the following is stated:

"In the absence of added catalysts, anhydrous formaldehyde and paraformaldehyde dissolve in molten phenol without apparent reaction to give clear, colorless solutions which smell strongly of formaldehyde. In such solutions, it is probably that some solvation takes place and hemiformals, such as $C_6H_5OCH_2OH$, $C_6H_5OCH_2OCH_2OH$, etc., are present. However, studies of formaldehyde polymers have demonstrated that phenol is a solvent for these compounds and the majority of the dissolved formaldehyde in phenolic solutions may be in the polymerized state. Studies by Fitgerald and Martin[44] involving the measurement of hydroxyl ion concentrations in dilute, alkaline, aqueous formaldehyde in the presence and absence of the sodium phenolate of mesitol indicate that hemiformal concentrations are too small to be measured in this way. However, in our opinion hemiformal formation with a hindered phenol, such as mesitol, would be similar to hemiformal formation with tertiary butyl alcohol which does not show any appreciable solvation of formaldehyde. There is a definite analogy of nonaqueous phenol formaldehyde solutions to solutions of formaldehyde in alcohols and other polar solvents. According to Reychler[102], a small percentage of sodium phenolate catalyzes the solution of linear formaldehyde polymers in phenol, just as sodium alcoholates catalyze solution in methanol, ethanol, and other alcohols. That

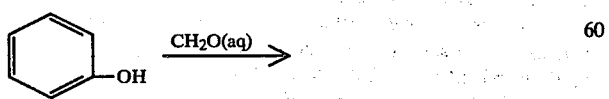

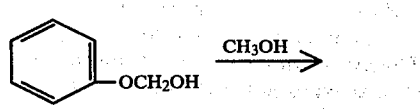

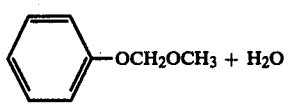

hemiformals are produced is also indicated by the isolation of methyl phenol formal from an acid-catalyzed reaction of phenol with formaldehyde solution containing methanol[20]."

[44] Fitzgerald, J.S.; Martin, R. J. L., Australian J. chem. 8 194-214 (1955).
[102] Reychler, A., Bul. Sot. Chim. (4), Vol. 1, pp 1189-95 (1907): Chem. Abs. 2 1266 (1908).
[20] Breslauer, J., Pictet, A., Berichte, 40, 3785 (1907).

One of the difficulties with the conclusion which is raised in the Walker article is that the hemiformal is produced from an acid-catalyzed reaction of phenol with a formaldehyde solution containing methanol. It is notoriously well known that acids act to catalyze the reaction of phenol with formaldehyde to effect normal alkylation of phenol by formaldehyde to produce the phenolic resins. Thus what is seen by Walker as a suggestion of the existence of the hemiformal may be nothing more than the known reaction between methanol and formaldehyde in the presence of an acid catalyst to form a product which is subsequently reacted with phenol to yield an ether product which is characterized as the final product of the reaction. Actually a reaction between formaldehyde and phenol to produce the hemiformal would have yielded an equilibrium reaction and this is totally absent from the reaction characterized by Walker, suggesting again that in the theoretical reaction disclosed by Walker the formaldehyde is first stabilized with methanol and then the product is reacted with phenol.

Bakeland and Bender in an article in "Industrial and Engineering Chemistry" Volume 17, No. 3, pages 225-237 (1925) make the following statements concerning the formation of a theoretical hemiformal of phenol:

"The phenol first unites directly with the aldehyde to form a mixed ether-alcohol compound (XXXIII), and the resulting ether group very rapidly rearranges to the phenol.

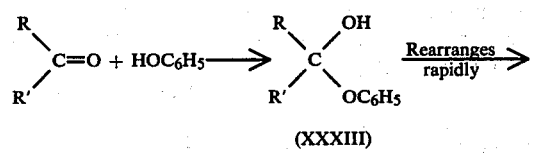

(XXXIII)

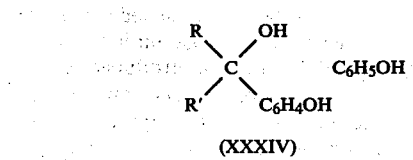

(XXXIV)

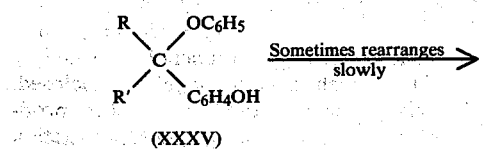

(XXXV)

-continued

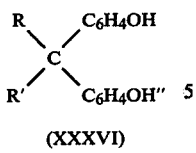

(XXXVI)

Thus, Bakeland and Bender clearly indicate that if the hemiformal exists it is at best a transitory material which is unstable under the conditions at which it was produced and, at best, is a theoretical composition constituting an intermediary in the generation of phenolic resins.

Strupinskaya et. al. in Plast. Massy 1968, (12), at pp 18–20 describe the preparation of a product by the absorption of formaldehyde into molten phenol at a formaldehyde to phenol ratio of 3:10. This corresponds to a formaldehyde to phenol mole ratio of 0.94:1. The source of formaldehyde was a converter gas stream containing about 10% methanol and analysis of the product showed it to contain up to 8% methanol. The presence of methanol suggests that this reference refers to a methanol stabilized product similar to that disclosed in Walker cited above, wherein formaldehyde reacts with methanol and subsequently reacts with phenol to form the ether product. The low formaldehyde to phenol ratio also suggests that hemiformals having average formaldehyde to phenol ratios higher than 1:1 would probably not have been formed in this process.

In Belgium Pat. No. 667,360, issued on Nov. 16, 1965, to Chemische Werke Huels A. G., is disclosed treatment of various hydroxy-compounds, including phenol, with monomeric formaldehyde, at a formaldehyde to phenol ratio of 1:1. The low formaldehyde to phenol ratio would indicate that any hemiformal formed would have no more than an average of one formaldehyde moiety structure in the hemiformal chain structure. As disclosed in Bakeland and Bender, cited above, hemiformals are known in the art as transitory or unstable species and would be expected by one of ordinary skill to be increasingly unstable as the length of the hemiformal chain increases. It would, therefore, be expected that additional formaldehyde added in the Huels process would react with the phenol at another site on the aromatic ring, such as at the para or ortho-position, rather than forming hemiformals with a higher formaldehyde to phenol ratios. A person normally skilled in the art would, therefore, expect that hemiformal compositions having formaldehyde to phenol ratios greater than 1:1, wherein hemiformal chains having more than one formaldehyde moiety are formed, would be unstable, forming other phenol-formaldehyde resinous products or dissociating to form free formaldehyde.

The first time where it has been established that hemiformals of phenol having an average molar ratio of formaldehyde to phenol have been produced which have a recognized stability, are isolable, and can be utilized in the formation of a variety of products, particularly phenol-formaldehyde resins, is in copending U.S. patent application, Ser. No. 340,719 filed on Jan. 19, 1982, by F. Covitz, G. Brode, and S. Chow wherein liquid hemiformal compositions of phenol produced by the reaction of formaldehyde and phenol are disclosed. The hemiformals therein disclosed are reaction products of phenol and formaldehyde wherein the reaction occurs between the formaldehyde and the phenolic hydroxyl group to form a liquid hemiformal having the formula;

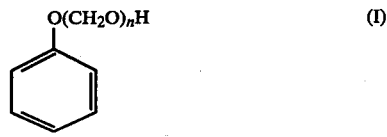

wherein n is a positive number greater than 1, preferably a number greater than 1 and less than about 5, and most preferably a value of about 1.2 to about 2.5. These hemiformals are liquid and of low viscosity.

Also disclosed are hemiformal compositions comprising the hemiformal of Formula (I) in combination with up to about 50 mole percent, based on the total moles of the composition, of another hemiformal having the following formula:

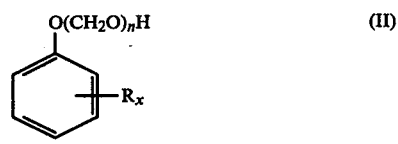

wherein n is as described above, R is any substitutent typically employed in conjunction with a phenolic structure and x has a value of from 1 to about 3. With respect to R, it is preferably a monovalent radical which includes alkyl of from about 1 to about 18 carbon atoms, cyclo-alkyl from 5 to 8 carbon atoms, aryl containing from 1 to about 3 aromatic rings, aralkyl, alkaryl, alkoxy containing from 1 to about 18 carbon atoms, aroxy containing 1 to 3 aromatic nuclei, halide such as chloride, bromide, fluoride, and iodide; alkyl sulphido having from 1 to about 18 carbon atoms, aryl sulphido having from 1 to about 3 aromatic nuclei, and the like.

Hemiformals derived from oil-modified phenols such as linseed oil or tung oil-modified phenols are also disclosed.

As disclosed in the above cited application, the hemiformal-forming reaction is preferably carried out in the absence of any catalyst. Generally, a catalyst adversely affects the formation of hemiformals, causing the formation of other phenol-formaldehyde resinous products. It has been found, however, that in the presence of a divalent-metal catalyst, more fully defined below, phenol and formaldehyde react to form equilibrium mixtures of hemiformals of phenol and hemiformals of methylolated phenol. This is unexpected in light of the common knowledge in the art that catalyzed reactions of phenol and formaldehyde generally form phenol-formaldehyde resinous products that are condensation products of phenol and formaldehyde, and typically do not form phenol hemiformals. It is also unexpected that the novel hemiformals of methylolated phenol that are formed in this reaction are stable, and isolatable and are not transitory materials that immediately form condensation products. This invention represents the first time that such hemiformals of methylolated phenol have been identified. The hemiformals of the invention can also be used in the formation of a variety of products, among which are, of course, phenol-formaldehyde resins.

This invention is directed to the manufacture of a new composition of matter which contains at least one of the following structures:

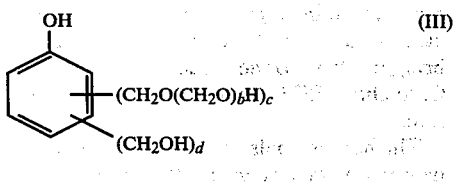

and

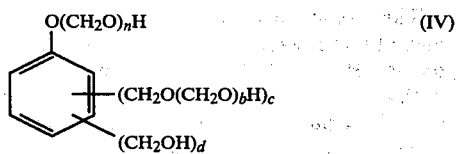

In the above formulas, b is 1 to about 5, c is 1 to about 3, d is 0 to about 2, the sum of c and d is at least 1 and no greater than 3 and n has a value greater or equal to 1, preferably from 1 to about 5, most preferably about 1.2 to 2.5. It is understood that these numbers represent average values and a hemiformal composition will actually comprise a mixture of hemiformals as defined above.

This invention also encompasses the utilization of the hemiformals discussed above in combination up to about 50 mole percent, based on the total moles of the composition, with substituted hemiformals having at least one of the following structures;

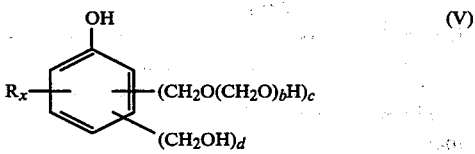

and

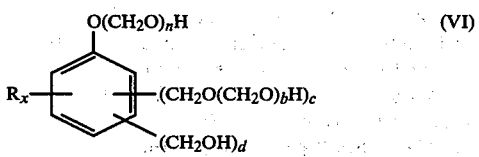

wherein n, b, c, d, are defined as above, R is any monovalent substitutent typically employed in conjunction with a phenolic structure, x has a value of from 1 to about 3 and the sum of c and d is at least 1 and not greater than 3, and the sum of c, d and x is at least 1 and not greater than 5, wherein with respect to the R substitution at least 2 of the ortho- or para-positions relative to the OH or —O(CH$_2$O)$_n$H groups are free. With respect to R, it is preferably a monovalent radical which includes alkyl of from about 1 to about 18 carbon atoms, cycloalkyl from 5 to 8 carbon atoms, aryl containing from 1 to about 3 aromatic rings, aralkyl, alkaryl, alkoxy containing from 1 to about 18 carbon atoms, aroxy containing 1 to 3 aromatic nuclei, halide such as chloride, bromide, fluoride, and iodide; alkyl sulphido having from 1 to about 18 carbon atoms, aryl sulphido having from 1 to about 3 aromatic nuclei, and the like. The hemiformals of Formulas V or VI should not exceed the molar concentration, in the preferred embodiment, of the unsubstituted hemiformals of Formulas III or IV. One of the advantages of the utilizing of the substituted hemiformals of Formulas V or VI in combination with the unsubstituted hemiformals of Formulas III or IV is that the former tend to alter the properties of any resulting phenolic resin which is derived from the combination of the two, such property changes being of the kind which allows for a maximum utilization in the manufacturing of a variety of phenolic resin type products. For example the halogen substitution will enhance the flame retardancy of the resultant phenolic resin. A aryl-alkyl substitution which contains a hydroxyl group as well, such as bisphenol A, will provide a phenolic resin which is a superior coating resin and will possess better color properties. Also, a diphenol such as bisphenol A, has an additional phenolic hydroxy group, providing another site for hemiformal production. Preferably the substituted phenolic hemiformals shown in Formulas V or VI should have at least a functionality of two. That is it should, with respect to the R substituent only, have at least both ortho-positions or have an ortho- and a para-position open, relative to the —OH or —O(CH$_2$O)$_n$H group. This allows for chain growth and cross-linking reactions to occur as the hemiformals of the invention are cured. The various substituents in Formulas V and VI, as defined as R above, impart to the final resinous product formed by the coreaction of the substituted hemiformals of Formulas V and VI with those of Formulas III and IV, properties that would be expected in conventional phenolic resin chemistry.

Mixtures of substituted hemiformals that are derived from oil-modified phenols such as linseed or tung oil-modified phenols are also contemplated. These modified phenols are prepared by reacting phenol and the oil in the presence of an acid ion exchange resin. It is well known that modified phenols comprise complex mixture containing phenol and various substituted phenols derived from reaction of the phenol with the sites of unsaturation in the carbon-chains of the oils. The resulting substituted or modified phenol mixture can then be treated with formaldehyde in the presence of a divalent metal cation as is described below to produce a hemiformal mixture. In using oil-modified phenols to make hemiformals, at least 50 mole percent of the phenol used in the hemiformal reaction should be unreacted with the oil.

The methylolated phenol hemiformals of the invention can be prepared by reacting formaldehyde and methylolated phenols having the formula

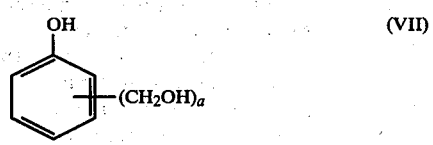

where a is 1 to about 3. The formaldehyde may be reacted with the methylolated phenol as such, but preferably the hemiformals of the invention are formed by reacting a mixture of liquid phenol and paraformaldehyde in the presence of a divalent metal cation catalyst as more fully described below. In this method methylolated phenols of formula VII are formed in situ in the reaction mixture. Paraformaldehyde then reacts with the phenolic hydroxy group and the methylol groups of the methylolated phenol to form the hemiformals of methylolated phenol described above. It is, therefore not necessary to isolate the methylolated phenols.

As mentioned above, in addition to hemiformal production at the methylol groups, the phenolic hydroxyl group also participates in hemiformal-forming reactions. Thus, in the case where unsubstituted phenol is used, an equilibrium mixture is formed comprising a hemiformal of the formula;

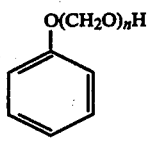
(I)

and the novel hemiformals of the invention of the formulas:

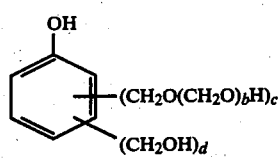
(III)

and;

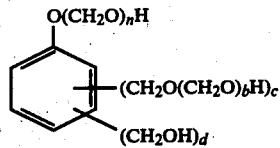
(IV)

wherein n, b, c and d are defined as above.

Thus, unlike the method for forming hemiformal compositions of the above cited application U.S. Ser. No. 340,719, wherein hemiformals are formed having substantially all of the hemiformal production at the phenolic hydroxy group, the method of the present invention, wherein a divalent metal cation is used, produces equilibrium mixtures containing hemiformals with the hemiformal production at both the phenolic hydroxy and methylol groups.

The methylolated phenol hemiformal compositions of this invention are curable and yet stable compositions, typically having a good stability at temperatures between about 35° C. to about 55° C. Indeed, such materials may even be kept in storage for substantial periods of time at lower temperatures or even higher temperatures than the range of about 35° C. to about 55° C. However, when kept at lower temperatures, there is a tendency for formaldehyde to separate from the product in varying concentrations, causing the formation of paraformaldehyde crystals. At temperatures in excess of 55° C. there is an increased chance for the loss of formaldehyde from the hemiformal structure which formaldehyde can become available for reaction with the benzene ring typically in the ortho- or para-position relative to the —OH or O(CH₂O)ₙH groups thereby causing the formation of phenol-formaldehyde resinous condensation type structures. The rate at which that occurs, of course, is dependent upon the temperature at which the hemiformal is stored, higher temperatures causing a more rapid formation of a condensation-type product with a phenol-formaldehyde structure. Formaldehyde which separates into paraformaldehyde type structures at temperatures below 35° C., can be restored to a clear hemiformal product by bringing the product back up to a temperature of between about 35° C. to about 55° C. Thus, products stored at lower temperatures wherein crystallization or sedimentation has occurred can be utilized in their most effective form by bringing them to the moderate temperature of about 35° C. to about 55° C. to achieve the products of this invention.

The hemiformals of this invention are liquid materials having a very low viscosity, typically from about 20 to 100 centipoise (Brookfield) when measured at about 35° C. to 55° C.

The hemiformals of methylolated phenol can be made by the reaction of paraformaldehyde with liquid phenol. By liquid phenol is meant a phenol in solution with a solvent unreactive with phenols or aldehydes; or essentially pure molten phenol. The temperature of the reaction is where the phenol is liquid. Suitable reaction temperatures are from about 60° C. to about 100° C., preferably from about 80° C. to about 90° C. Liquid mixtures of phenol and substituted phenols having the formula

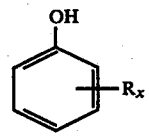

where R and x are defined above, can also be used with the proviso that the moles of substituted phenol not exceed the moles of unsubstituted phenol in the reaction mixture. Some of the substituted phenols or the hemiformal products derived therefrom may be solid at the reaction temperature. In such a case an unreactive solvent may be used to form a liquid solution.

The reaction takes place in the presence of a divalent metal cation such as magnesium, calcium, strontium, barium, zinc, lead, cadmium or mercury, at a pH of about 3 to about 8, preferably from about 4 to about 6. Typically the metal cation is supplied as a salt or as an alkoxide such as a carboxylate salt, or a methoxide or ethoxide of the metal in combination with a mild acid in order to achieve the desired pH.

Suitable salts include the formates, acetates, benzoates, and valerates. Examples of these salts include zinc acetate dihydrate, calcium formate, manganous acetate, lead acetate and zinc benzoate.

The catalyst is generally present at a concentration of about 0.2 to about 1 weight percent, preferably 0.4 to 0.7 weight percent, based on the total weight of the reaction mixture.

The paraformaldehyde can be introduced directly to the liquid phenol. Preferably the paraformaldehyde is water-free.

As stated above it is desirable that the paraformaldehyde be free of water. However, providing paraformaldehyde which is free of water is quite difficult to do and in the normal case water will be carried along with the paraformaldehyde which is provided to the reaction. Usually the amount of water which is tolerable in the practice of this invention is that amount of water which will provide in association with the hemiformal, a water concentration of up to about 15 weight percent, based on the total weight of the hemiformal composition. In the preferred embodiment it is desirable that the amount of water which is present in the resultant hemiformal not exceed about 5 weight percent, based on the total weight of the hemiformal composition.

The reaction between paraformaldehyde and the liquid or molten phenol is carried out with stirring so as to effect intimate admixture of the reactants and the metal catalyst and to assure uniform reaction.

The reaction may be carried out at subatmospheric or superatmospheric pressures, however, in the usual case one will practice the hemiformal reaction at atmospheric pressure conditions.

Since the catalyzed reactions between paraformaldehyde and liquid phenol to make hemiformals of phenol, methylolated phenols and hemiformals of methylolated phenol, are exothermic, a water bath may be necessary to maintain the reaction temperature.

As previously indicated, a surprising feature of the invention is that the hemiformals of methylolated phenol are very stable materials. By "stable" it is meant that at temperatures of between about 35° C. to about 55° C. the formaldehyde which is in the hemiformal moiety reacts insignificantly with the aromatic moiety thereof to produce a condensation phenolic resin-like structure. For example data indicates that at a temperature of about 35° C. about 0.04 mole percent of the formaldehyde present in the hemiformal structure is reacted after twenty four hours. When the temperature increases to 55° C. the rate of reaction consequently increases.

The unsubstituted liquid hemiformals of Formulas III or IV, alone or combined with the substituted hemiformal of Formulas V or VI above, may be easily converted into phenolic resins by utilizing any one of the various acid or basic catalysts typically employed in the manufacture of phenolic resins by the reaction of phenol with formaldehyde. In order to adjust the ratio of formaldehyde to phenol, it may be desirable to add phenol to the composition. The addition of phenol to the composition allows one to balance out the ratio of formaldehyde to phenol and thereby allows one to make either a novalac or resole resin composition. In this case, each of the formal moieties that are present in the hemiformal constitutes the full equivalent of a formaldehyde molecule and thus one can determine from the formaldehyde concentration of hemiformal exactly which type of phenolic resin they desire to produce, simply by the addition or lack of addition of phenol. Since, the hemiformal is extremely reactive in the presence of the acid or basic catalyst it is not necessary to add heat when making a phenolic resin from them. Simple addition of the phenol-aldehyde resin curing catalyst to the hemiformal with or without phenol will result in polymerization and the production of the desired phenolic resin.

The following examples are not intended to limit this invention in any way.

EXAMPLE I

Methylolated phenol hemiformal was prepared as follows. To a 5 liter reaction flask equipped with a thermometer, stirrer and an addition port there were charged 1410 grams (15 g-moles) of phenol, 742 grams of 91 percent paraformaldehyde (22.5 g-moles formaldehyde equivalent) and 10.8 grams of zinc acetate dihydrate as catalyst. The mixture was stirred and heated to 85° C. for about 20 minutes. A mild exotherm ensued; the reaction mixture was maintained at from 80° to 90° by removal of the external heat source and by occasional cooling with a water bath. After the exotherm subsided, heat was reapplied to maintain a reaction mixture temperature of 80° to 90° C. until a clear solution was obtained; this took from about 1 to 2 hours. Nuclear magnetic resonance analysis showed the product to be a mixture of hemiformals of phenol and hemiformals of methylolated phenol.

EXAMPLE II

This Example illustrates the use of the hemiformal of Example I in a thermosetting composition and the curing of the composition to make a fiber reinforced composite.

A solution was formed by dissolving a resole phenol formaldehyde resin in lump form in the hemiformal of Example I to give a solution of 70 weight percent hemiformal and 30 weight percent resole. The formaldehyde/phenol ratio of the hemiformal was 1.5 and the viscosity was 1,500 centipoise (Brookfield) at 40° C.

The resole was formed by reacting an aldehyde and phenol at an aldehyde to phenol ratio equal or greater than one in the presence of an alkaline catalyst. The resole had an Inclined Plate Flow of 40–90 mm at 125° C. The Inclined Plate Flow was determined by compressing a one gram sample of the resole to a pellet 12 to 13 mm in diameter. This pellet was placed on a glass plate and heated for three minutes in a 125° C. oven. The plate was then tilted to a 60° angle and heating continued for an additional 20 minutes. The distance, measured in mm, the resin travelled is known as the Inclined Plate Flow. This value reflects the melt viscosity and the cure rate of the resin.

A reactive liquid prepolymer was prepared by adding phenol and sulfuric acid to the above liquid solution to form a liquid prepolymer containing phenol sulfonic acid. The added phenol to sulfuric acid weight ratio was 9 and the reactive liquid prepolymer contained 0.1 weight percent, based on the weight of the reactive liquid prepolymer, of the added phenol-sulfuric acid catalyst. The catalyzed mixture was then charged into a mold containing a fiber-glass mat. The mold was placed in a press and heated to curing a temperature of 120° C. to 150° C. and cured for 8 minutes. The product was a cured thermoset composite. The glass mat was type AKM available from PPG Industries, Inc., Pittsburgh, Pa. The glass content of the composition was 63.6 weight percent based on the cured weight of the composite.

What is claimed is:

1. A liquid composition of a hemiformal of methylolated phenol having at least one of the following structures:

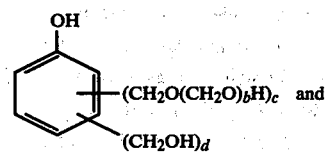

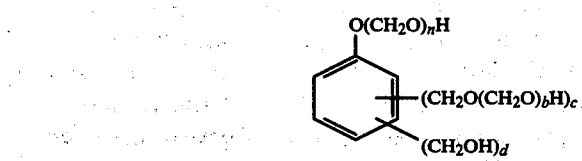

wherein b is 1 to about 5, c is 1 to about 3, d is 0 to about 2, the sum of c and d is at least 1 and does not exceed 3, and n is greater than or equal to 1, said hemiformal being stable between about 35° C. and about 55° C. and curable to a phenolic resin in the presence of a phenol aldehyde resin curing catalyst.

2. A composition of liquid hemiformals comprising at least 50 mole percent of a hemiformal of phenol having at least one of the following structures:

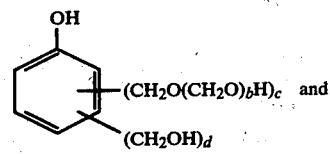

and

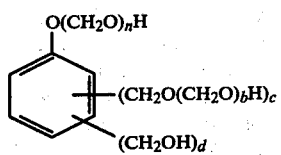

and a hemiformal of a substituted phenol having at least one of the following structures:

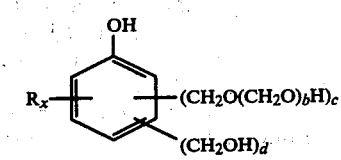

and

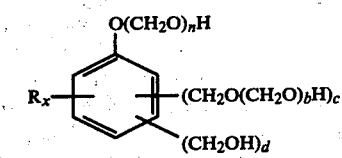

wherein b is 1 to about 5, c is 1 to about 3, d is 0 to about 2, n is greater than or equal to 1, x is 1 to about 3, the sum of c and d is at least 1 and does not exceed 3, the sum of c, d and x is at least 1 and does not exceed 5, and R is a monovalent radical selected from the group consisting of alkyl from 1 to 18 carbon atoms, cycloalkyl from 5 to 8 carbon atoms, aryl containing from 1 to 3 aromatic rings, aralkyl, alkaryl, alkoxy containing from 1 to 18 carbon atoms, aroxy containing 1 to 3 aromatic nuclei, a halide radical, alkyl sulfido having from 1 to 18 carbon atoms, aryl sulfido having from 1 to 3 aromatic nuclei, and a radical derived from linseed oil or tung oil, wherein with respect to the R substituent at least two of the ortho- or para-positions relative to the —OH or —O(CH$_2$O)$_n$H groups are free, said mixture being stable between about 35° C. to 55° C. and curable to a phenolic resin the presence of a phenol-aldehyde resin curing catalyst.

3. A liquid hemiformal composition comprising a mixture of hemiformals represented by the following structures:

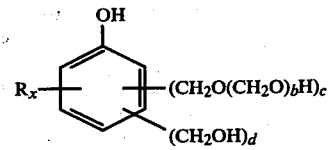

and

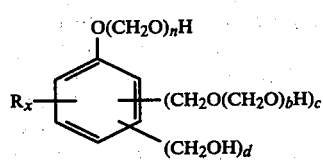

wherein b is 1 to about 5, c is 1 to about 3, d is 0 to about 2, n is greater than or equal to 1, R is a monovalent radical and x is 0 to 3, wherein for at least 50 mole percent of said composition x is 0, wherein the sum of c and d is at least 1 and does not exceed 3, and the sum of c, d and x is at least 1 and does not exceed 5, and R is a monovalent radical selected from the group consisting of alkyl from 1 to 18 carbon atoms, cycloalkyl from 5 to 18 carbon atoms, aryl containing from 1 to 3 aromatic rings, aralkyl, alkaryl, alkoxy containing from 1 to 18 carbon atoms, aroxy containing 1 to 3 aromatic nuclei, a halide radical, alkyl sulfido having from 1 to 18 carbon atoms, aryl sulfido having from 1 to 3 aromatic nuclei, and a radical derived from linseed oil or tung oil, wherein with respect to the R substituent at least two of the ortho- or para-positions relative to the —OH or —O(CH$_2$O)$_n$H group are free, said composition being stable between about 35° C. and about 55° C. and curable to a phenolic resin in the presence of a phenol-aldehyde curing catalyst.

4. The composition of claim 3 in admixture with a hemiformal represented by the structure

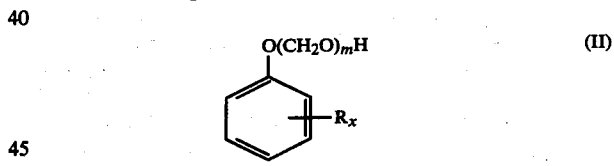

(II)

wherein m is greater than 1, R is a monovalent radical selected from the group consisting of alkyl from 1 to 18 carbon atoms, cycloalkyl from 5 to 8 carbon atoms, aryl containing from 1 to 3 aromatic rings, aralkyl, alkaryl, alkoxy containing from 1 to 18 carbon atoms, aroxy containing 1 to 3 aromatic nuclei, a halide radical, alkyl sulfido having from 1 to 18 carbon atoms, aryl sulfido having from 1 to 3 aromatic nuclei, and a radical derived from linseed oil or tung oil, and x is 0 for at least 50 mole percent of said composition.

5. The composition of claims 1 or 2 or 3, wherein n is from about 1 to about 5.

6. The composition of claim 4 wherein m is from about 1 to about 5.

7. The composition of claim 5 wherein n is from about 1.2 to about 5.

8. The composition of claim 6 wherein m is from about 1.2 to about 5.

9. A composition as defined in claim 2 wherein R is a radical derived from linseed oil or tung oil.

* * * * *